United States Patent [19]

Epchtein

[11] Patent Number: 4,487,785
[45] Date of Patent: Dec. 11, 1984

[54] CONTINUOUS PROCESS FOR THE FERMENTATION OF MUST TO PRODUCE WINE OR ETHANOL

[76] Inventor: Jacques S. Epchtein, Avenida Alexandre Petta, 953, Vila Resende 13400 Piracicaba, São Paulo, Brazil

[21] Appl. No.: 436,970

[22] Filed: Oct. 27, 1982

[30] Foreign Application Priority Data

Oct. 30, 1981 [BR] Brazil .................................. 8107043

[51] Int. Cl.³ ...................... C12G 1/00; C12G 2/00; C12P 7/06
[52] U.S. Cl. .................................. 426/15; 426/592; 435/813; 435/161
[58] Field of Search ............... 426/11, 13, 15, 592; 435/813, 161, 162

[56] References Cited

U.S. PATENT DOCUMENTS

| 2,139,408 | 1/1936 | Heaser | 426/15 |
| 3,062,656 | 12/1959 | Agabalianz et al. | 426/15 |
| 3,545,978 | 2/1967 | Gerasimovich et al. | 426/15 |
| 3,741,770 | 5/1969 | Van Olphen | 426/15 |
| 3,900,571 | 8/1975 | Johnson | 426/15 |

FOREIGN PATENT DOCUMENTS 905273  2/1982  U.S.S.R. .................................. 426/13

Primary Examiner—Robert Yoncoskie
Assistant Examiner—Marianne S. Minnick
Attorney, Agent, or Firm—Cushman, Darby & Cushman

[57] ABSTRACT

A continuous process for the fermentation of must to produce wine in a plurality of serially-connected fermentation vats comprises fermenting the must-containing medium in an initial fermentation zone employing one or more large fermentation vats, the volume capacity of said vats in the initial fermentation zone being equal to 60 to 80 percent of the volume of the must-containing medium being fermented and completing the fermentation in a final fermentation zone employing one or more fermentation vats each having a size smaller than the vats employed in said initial fermentation zone, the volume capacity of said vats in the final fermentation zone being equal to 20 to 40 percent of the volume of the must-containing medium being fermented.

7 Claims, 2 Drawing Figures

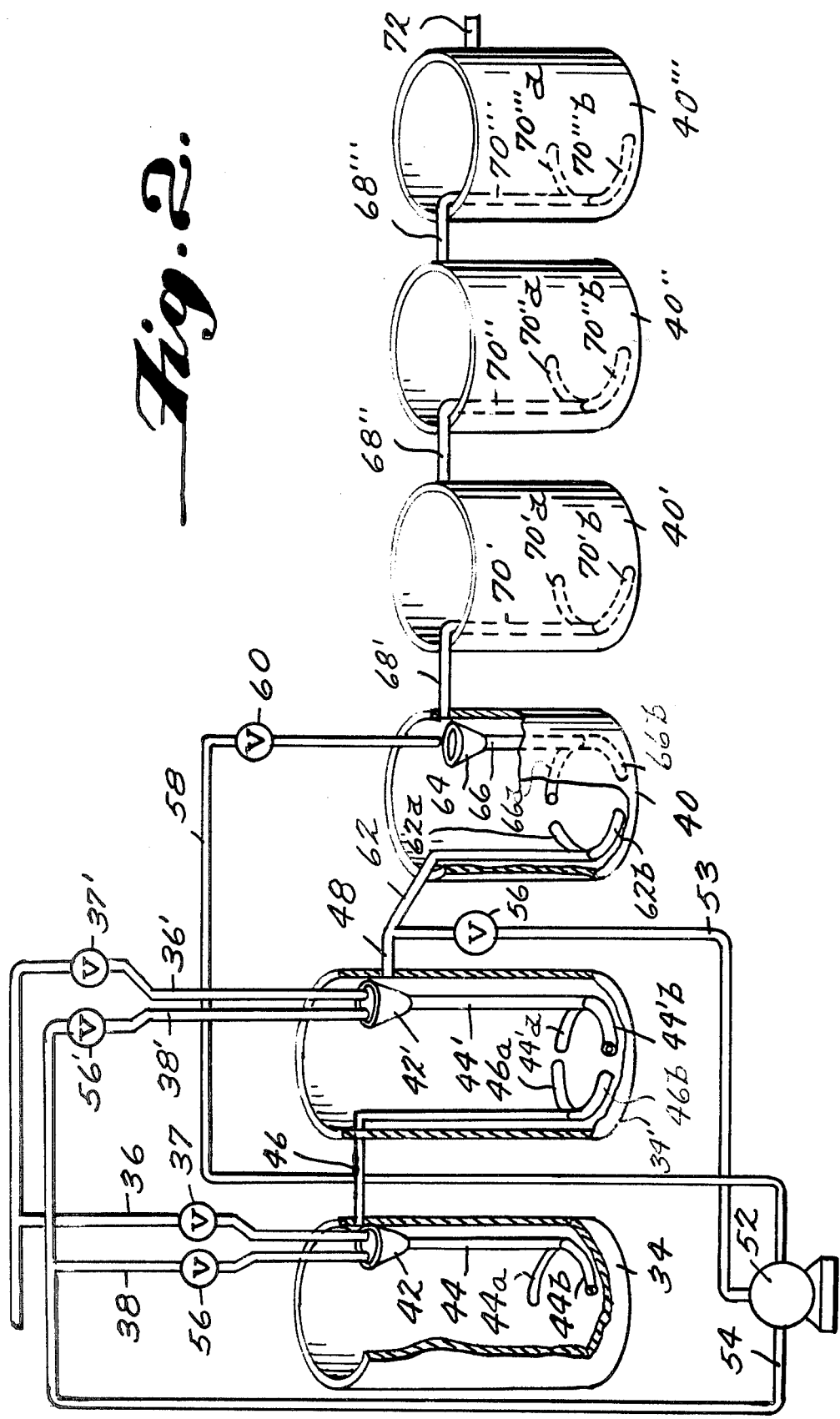

CONTINUOUS PROCESS FOR THE FERMENTATION OF MUST TO PRODUCE WINE OR ETHANOL

BACKGROUND OF THE INVENTION

The present invention relates to an improved process for the continuous fermentation of must in a plurality of serially connected fermentation vats to produce wine comprising fermenting the must in the initial fermentation stage in one or more relatively large fermentation vats and completing the fermentation of said must in the final fermentation stage in one or more fermentation vats having a size smaller than that employed in the initial fermentation stage.

Heretofore, in the continuous fermentation of a sugared must to obtain ethanol or wine, a plurality of serially connected fermentation vats, open or closed, being more or less equal in size were employed. The must, comprising the fermentation medium, was continuously introduced into the upper portion of the first fermentation vat wherein the initial fermentation took place. The fermentation medium was then withdrawn from the bottom or lower one-third portion of the first fermentation vat and introduced into the second fermentation vat, of approximately equal size, near the top or upper third portion thereof wherein the fermentation process was continued. This same operating scheme was repeated when more than two serially connected fermentation vats were employed, as was generally the case. Thus, the fermentation medium from the second fermentation vat was withdrawn from the bottom or lower one-third portion thereof and introduced into the third fermentation vat near the top or upper one-third portion thereof, this scheme being repeated until introduction of the fermentation medium into the final fermentation vat where the fermentation process was completed.

Thereafter, the resulting wine or ethanol was separated from the fermentation medium, generally, by centrifugation techniques, the separated wine then being directed to a distillation stage.

Also recovered during this centrifuging operation was a yeast cream stream which was acid treated for a period of time generally about 1 to 3 hours to reduce the pH thereof to about 2 or 3. The acid-treated yeast cream was then recycled to the initial fermentation vat. Thus, at least two treatment vats were required in a conventional continuous fermentation process to produce wine or ethanol, one being employed for the initial treatment operation, the other for completing the process wherein the desired product was withdrawn and a yeast cream, already treated, was recycled to the first of fermentation vat.

However, it has been observed that such a conventional fermentation process as described above exhibits some significant disadvantages. One important disadvantage is that the control of the drop in degrees Brix of the wine being produced from one vat to the next is difficult to follow, this being occasioned by the use of fermentation vats having a more or less equal size.

As a consequence of this, it has been found difficult to select for introduction into the distillation process the optimum fermentation medium, i.e. the medium in a given fermentation vat having the highest alcohol content and the lowest residual reducing sugar level. Also, it has been observed that with the use of equally sized fermentation vats throughout the fermentation process, yeasts or other deposits collect at the bottom of the vats, the fermentation medium retention time in each such equally sized vat being essentially the same for a given batch.

Another disadvantage often associated with a conventional fermentation process as described above is that because of the circulation pattern of the fermentation medium, as more fully described below with reference to FIG. 1, fermentation media having different degrees Brix and therefore different alcohol contents are admixed which can be deleterious to the fermentation process.

Yet another significant disadvantage often experienced in the conventional fermentation process described above results from recycling yeast cream from the final fermentation vat to the initial fermentation vat. This recycled yeast cream generally is expended or significantly weakened due to its prolonged contact with the quantities of alcohol produced in the medium and also with various impurities present in the final fermentation vat from which it is withdrawn.

GENERAL DESCRIPTION OF THE INVENTION

It has now been found that the above disadvantages associated with a conventional continuous fermentation process can be overcome by fermenting the fermentation medium comprising must and yeast, the latter including a yeast recycle stream, in an initial fermentation stage in one or more relatively large fermentation vats, open or closed, and fermenting the fermentation medium in a final fermentation stage in one or more fermentation vats having a size smaller than that employed in the initial fermentation stage.

The use of one or more relatively large fermentation vats during the initial fermentation stage provides not only a large fermentation medium retention time but also provides that degree of inertia in the medium so that problems due to yeast infection, variation in degrees Brix of the must, pH variation and the like are more easily controlled and/or rectified. The use of one or more relatively smaller fermentation vats during the final fermentation stage makes it possible to carefully monitor the drop in degrees Brix of the fermentation medium, thus permitting easy choice of the best fermentation medium stream to introduce into a subsequent distillation operation, thereby avoiding leaving the desired product, i.e. the wine or ethanol too long in contact with the total fermentation medium at the termination of the fermentation process. Such prolonged contact is harmful, qualitatively and quantitatively, to the alcohol in the wine. Further, the use of smaller fermentation vats during the final fermentation stage permits a shorter fermentation medium retention time and concomitantly greater agitation of the medium contained therein. Even though the fermentation activity at this stage of the process may be diminished, it has also been found that the use of these smaller vats prevents or substantially eliminates the formation or occurrence of deposits on the bottom of these smaller vats. Moreover, because of this smaller size and consequently a smaller surface area, alcohol evaporation losses are significantly reduced, it being observed that in this final stage of the process, the alcohol content in the fermentation medium is the highest.

DETAILED DESCRIPTION OF THE INVENTION

Figure 1:
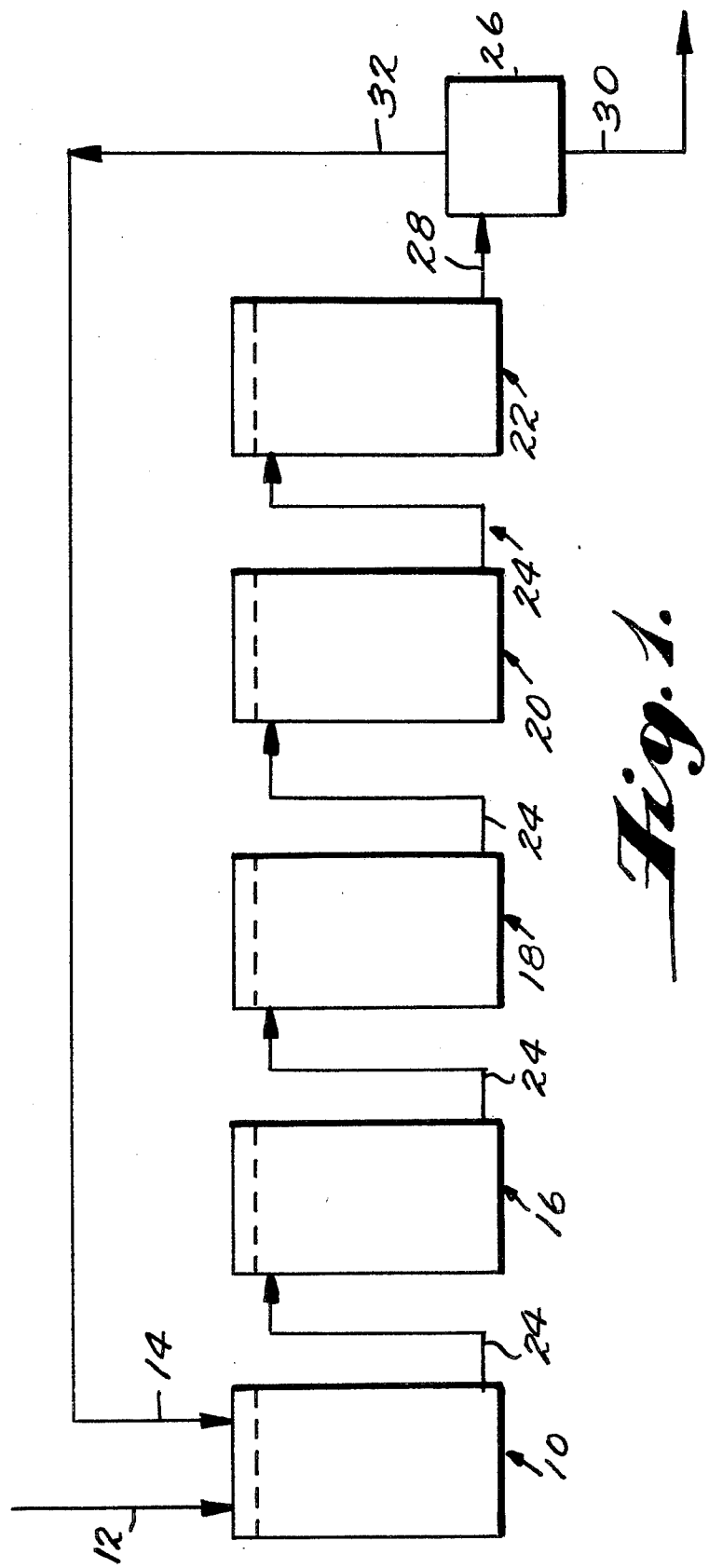

The present invention is described in greater detail with reference to the accompanying drawings wherein:

FIG. 1 describes a conventional continuous fermentation process as outlined above; and FIG. 2 describes the continuous fermentation process of the present invention.

Referring now to FIG. 1, the medium to be fermented comprising must and yeasts cream are introduced into a first fermentation vat 10, via lines 12 and 14, respectively, near the top or upper one-third portion of said vat 10. Serially connected to vat 10 is one or more fermentation vats 16, 18, 20 and 22. The fermentation medium from each vat is withdrawn from the bottom or lower one-third portion thereof and introduced into the immediately following vat near the top or upper one-third portion thereof via line 24 except for the final fermentation vat where the withdrawn fermentation medium is introduced into wine or alcohol separation means 26 generally a centrifuge, via line 28. The desired product, wine or alcohol is withdrawn from separation means 26 via line 30 and sent to a distillation stage, not shown. The yeasts cream recovered from the separation means 26 is recycled to the initial fermentation vat 10 via line 32 and line 14 after treatment as it were related. The disadvantages of this circuit have been noted above. Thus, because of the more of less equal size of vats 10, 16, 18, 20 and 22, it is difficult to monitor or follow the degrees Brix drop of the fermentation medium through the circuit, i.e. from one vat to the next. Further, it has been found difficult to select the vat containing the ideal fermentation medium in terms of its alcohol content and residual reducing sugar content for withdrawal and introduction into a distillation operation. Moreover, because the vat residence time of the medium is essentially the same for each vat due to their essentially equal size, the formation of undesirable deposits on the bottom of the vats is not generally avoided. Also, the yeasts cream stream originating from the final fermentation vat 22 and recycled to the initial fermentation vat 10 via separation means 26 is essentially spent and/or significantly weakened. Additionally, due to the fermentation medium circulation pattern, i.e. from the bottom of a given vat to the top of the next succeeding vat with consequent downward flow therethrough, media of significantly different degrees Brix are admixed which can seriously disturb the fermentation process and the formation of deposits on the bottom of each vat favored.

On the other hand, as shown in FIG. 2, the circulation pattern of the fermentation medium throughout the process of the present invention is significantly different from that employed in the conventional continuous fermentation process depicted in FIG. 1, the present invention overcoming the disadvantages noted above with respect to this conventional process.

Referring now specifically to FIG. 2, the initial fermentation stage comprises at least one initial fermentation vat 34 and, for purposes of illustration, a second fermentation vat 34' is shown, it being understood that a plurality of said initial fermentation vats can be employed.

The medium to be fermented, i.e. a must stream and a fermentation yeast culture, such as for instance, *Saccharomyces cerevisiae* var. *ellipsoideus* are introduced into the initial fermentation zone, i.e. vat 34, and as shown vat 34', via must lines 36 and 36' controlled by valves 37 and 37' respectively, and yeast culture lines 38 and 38', respectively. In the initial fermentation zone the total volume of the initial relatively large fermentation vats, whether one or more are employed, is such as to contain from 60 to 80 volume percent of the total volume of must-containing fermentation medium being fermented.

The second or final fermentation zone, comprises one or more relatively smaller fermentation vats 40 and, as shown, additional vats 40', 40" and 40"'. The volume of each said relatively smaller fermentation vat is equal to about 10 to 20 percent of the total volume of the initial fermentation vat or vats, with the total volume of the fermentation vat or vats employed in the final fermentation zone being equal to about 20 to 40 percent of the total volume of the fermentation medium being processed at any given period during the continuous fermentation process of the present invention.

The must to be fermented and the yeast culture are introduced into vats 34 and 34' via funnels 42 and 42' which are in communication with fermentation medium distribution means such as pipes or tubing 44 and 44', respectively. Each of pipes or tubing 44 and 44' is bifurcated at the lower end thereof into sections 44a, 44b and 44'a, 44'b, perpendicularly or inclinedly disposed to tubing 44 and 44', respectively, the open terminus of these sections being in communication with the bottom of vats 34 and 34' respectively. This fermentation medium distribution means not only promotes more uniform introduction of the fermentation medium into the initial fermentation zone, but it also provides effective agitation of the medium contained therein so as to eliminate or at least substantially reduce the formation of deposits, including yeast culture and/or impurities, on the bottom of fermentation vats 34 and 34'.

The fermentation medium in vat 34 is continuously withdrawn therefrom via overflow line or pipe 46 which extends downwardly into vat 34' and terminates near the bottom thereof at which point it is bifurcated into sections 46a and 46b, perpendicularly or inclinedly disposed to pipe 46, the open terminus of sections 46a and 46b also being in communication with the bottom of vat 34'. Again this arrangement promotes more uniform distribution of the fermentation medium in the vat, aids in the agitation of the medium contained therein and assists in avoiding deposit buildup at the bottom of fermentation vat 34'.

The fermentation medium in the last of the fermentation vats, such as vat 34' when more than one is employed in the initial fermentation stage, is withdrawn from the top or upper section, thereof via line 48.

A portion of the fermentation medium withdrawn from the initial fermentation zone via line 48 is diverted through valve 50 and introduced into separation means 52, via line 53, which conveniently can be a centrifuge, so as to separate fermented must from yeasts cream or culture. The separated yeasts cream or culture is recycled to the initial fermentation zone via line 54 and introduced into one or all of the relatively large fermentation vats comprising the initial fermentation zone, via line 38 and/or 38', as illustrated, which are controlled by, for instance, valves 56 and 56'.

The stream of fermented must and any residual yeast culture separated in separating means 52 is introduced into the final fermentation zone comprising, as noted above, one or more serially connected fermentation vats such as 40, 40', 40" and 40"', via line 58.

Generally, the volume of fermentation medium withdrawn from the initial fermentation zone via line 48 and diverted via valve means 50 and line 53 to separation means 52 is not greater than 75 percent thereof. The remainder of the medium withdrawn from the initial fermentation zone via line 48 is introduced into the first of the final fermentation vats 40, when a plurality of the same are employed, via pipe or tubing 62.

Pipe 62 extends downwardly into final fermentation vat 40 and terminates near the bottom thereof at which point it is bifurcated into sections 62a and 62b, perpendicularly or inclinedly disposed to pipe 62, the open terminus of sections 62a and 62b being in communication with the bottom portion of fermentation vat 40. As before, this arrangement promotes more uniform distribution of the fermentation medium within the vat, creates effective agitation of the medium therein and eliminates or at least significantly reduces deposit buildup on the bottom of the vat.

The stream of fermented must and residual yeast cream or culture separated in separation means 52 for delivery to the final fermentation separation zone is introduced into vat 40 via funnel 64 which is in communication with medium distribution means comprising pipe or tubing 66 extending downwardly in said vat 40. The lower end of pipe 66 is bifurcated into perpendicularly or inclinedly disposed sections 66a and 66b, the open terminus of each being in communication with the bottom portion of vat 40 so as to afford the same advantages enumerated above, for instance, medium distribution means comprising tubing 44 and 44' and their attendant bifurcated portions.

When, as illustrated in FIG. 2, more than one final fermentation vat is employed, said additional vats being serially connected thereto as in the case of vats 40', 40" and 40''', the fermentation medium is withdrawn from adjacent the top portion of the immediately preceding vat and introduced into the immediately following vat via line 68', 68" and 68'''.

Each of lines 68', 68" and 68''' has a portion 70', 70" and 70''', respectively, which extends from adjacent the top of vat 40', 40" and 40''' respectively downwardly to adjacent the bottom of vat 40', 40" and 40''', also respectively. Again, the lower end of each of pipes 70', 70" and 70''' is bifurcated into perpendicularly or inclinedly disposed sections 70'a, 70'b; 70"a, 70"b; and 70'''a, 70'''b, respectively to provide effective fermentation medium distribution means having comparable attendant advantages as noted above.

The resulting desired product, i.e. wine, is withdrawn from the final fermentation zone via line 72 which is in communication with the upper portion of the final fermentation vat 40''', as shown in FIG. 2, the desired product being sent to a distillation zone, not shown.

The technical, economical and operational advantages achieved by the present invention are numerous. The more significant advantages include elimination of yeast treatment operation and associated equipment including pre-fermenters with their required electromechanical equipment, including valves, tubes, electrical cords and housing structures as well as washing operations; a significant reduction in total vat volume since only about 6 to 10 liters of vat volume are required to produce one liter of alcohol, this reduction in vat volume also effecting a corresponding reduction in plant floor space and equipment and construction expenditures; a significant reduction in costs for separation means equipment such as centrifuges; an appreciable increase in desired product yield due to increased fermentation activity as well as optimum process flexibility including easy re-start after a shut-down without renewing the ferment nor a supplementary centrifuge, as well as the capability of employing a richer must feed so as to obtain a product having a higher alcohol content and reduced waste production and the capability of permitting the fermentation medium to remain in the vats for longer periods of time without undue risk of contamination even in the absence of conventional antiseptic agents and without production of excessive amounts non-alcoholic impurities in the wine thereby promoting the production of an acceptable quality wine and a lower COD distillation waste production; a reduction in alcohol loss due to evaporation owing to a smaller surface area of the final distillation medium vats wherein the highest alcohol content medium is found; promotion of improved operation regularity including automatic regulation of degrees Brix, pH, level, temperature and the like thereby favoring the production of a more uniform wine and more economical distillation operation; reduction in wash water and dilution water costs; reduction in cooling water costs due to a more even distribution of temperature rises among the vats employed; and avoidance or substantial decrease in the production of deposits at the bottom of the vats under normal utilization and continuous operation due to the fact that the major amount of fermentation takes place in the relatively large vats of the initial fermentation zone, the increased rate at which the fermentation medium passes through the vats located in the final fermentation zone and to the increased agitation of the fermentation medium achieved using the fermentation medium feed means of the present invention.

What is claimed is:

1. A process for the continuous fermentation of must to produce wine in a plurality of serially-connected fermentation vats comprising fermenting a must-containing medium in an initial fermentation zone in a plurality of relatively large fermentation vats, transferring the initially fermented must-containing medium to a final fermentation zone and completing the fermentation of the must-containing medium in said final fermentation zone in a plurality of fermentation vats having a size smaller than the size of the fermentation vats employed in said initial fermentation zone, the fermentation vats in said initial fermentation zone having a volume capacity equal to 60 to 80 percent of the total volume of must-containing fermentation medium being fermented in both the initial and final fermentation zones and the fermentation vats in said final fermentation zone having a volume capacity equal to 20 to 40 percent of the total volume of said must-containing fermentation medium being fermented.

2. The process of claim 1 where in the initial fermentation zone, said must-containing fermentation medium is transferred from one said relatively large fermentation vat to the immediately next relatively large fermentation vat by withdrawing said must-containing fermentation medium from an upper portion of said one relatively large fermentation vat and introducing the withdrawn must-containing fermentation medium into the lower portion of said immediately next relatively large fermentation vat.

3. The process of claim 1 where in the final fermentation zone, said must-containing fermentation medium is transferred from one final fermentation vat therein to the immediately next final fermentation vat by withdrawing said must-containing fermentation medium from an upper portion of said one final fermentation vat and introducing the withdrawn must-containing fermentation medium into the lower portion of said immediately next final fermentation vat.

4. The process of claim 1 wherein each fermentation vat in said final fermentation zone has a volume capacity equal to 10 to 20 percent of the volume capacity of one said relatively large fermentation vat employed in said initial fermentation zone.

5. The process of claim 1 wherein the must-containing fermentation medium in the initial fermentation zone is withdrawn therefrom and transferred to said final fermentation zone by introducing the same into a first fermentation vat in said final fermentation zone at a lower portion thereof.

6. The process of claim 1 wherein transferring the initially fermented must-containing fermentation medium from said initial fermentation zone to said final fermentation zone includes withdrawing a portion of the must-containing fermentation medium being transferred, separating a yeast containing stream from said withdrawn must-containing fermentation medium, recycling said separated yeast containing stream to said initial fermentation zone and introducing the remainder of said separated withdrawn must-containing fermentation medium into said final fermentation zone.

7. The process of claim 1 wherein the must-containing fermentation medium from the last of the fermentation vats in said final fermentation zone is withdrawn from the upper portion of said last fermentation vat and thereafter distilled.

* * * * *

UNITED STATES PATENT AND TRADEMARK OFFICE
CERTIFICATE OF CORRECTION

PATENT NO. : 4,487,785
DATED : December 11, 1984
INVENTOR(S) : Jacques Samuel EPCHTEIN It is certified that error appears in the above—identified patent and that said Letters Patent is hereby corrected as shown below:

In Figure 2

Valve "56" in conduit or line "53"

should read --50--.

Valve "60" in conduit or line "58"

should be deleted.

Signed and Sealed this

Twenty-third Day of July 1985

[SEAL]

Attest:

DONALD J. QUIGG

Attesting Officer     Acting Commissioner of Patents and Trademarks